US012800938B2

(12) United States Patent
Wang et al.

(10) Patent No.: US 12,800,938 B2
(45) Date of Patent: Nov. 17, 2026

(54) HEAD-MOUNTABLE DEVICES WITH MODULAR ASSEMBLIES FOR FIT ADJUSTMENT

(71) Applicant: Apple Inc., Cupertino, CA (US)

(72) Inventors: Paul X. Wang, Cupertino, CA (US); Yoonhoo Jo, San Francisco, CA (US); Trevor J. Ness, Santa Cruz, CA (US); Samuel O. Schneider, Redwood City, CA (US); Adam Y. Kollgaard, Santa Clara, CA (US); Scott M. Leinweber, Sunnyvale, CA (US); Jeremy C. Franklin, San Rafael, CA (US); Heidi Williamson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 542 days.

(21) Appl. No.: 18/134,479

(22) Filed: Apr. 13, 2023

(65) Prior Publication Data

US 2023/0251496 A1 Aug. 10, 2023

Related U.S. Application Data

(63) Continuation of application No. 18/094,896, filed on Jan. 9, 2023, now abandoned, which is a continuation (Continued)

(51) Int. Cl.
*G02B 27/01* (2006.01)

(52) U.S. Cl.
CPC .. *G02B 27/0176* (2013.01); *G02B 2027/0156* (2013.01)

(58) Field of Classification Search
None
See application file for complete search history.

(56) References Cited

U.S. PATENT DOCUMENTS 8,605,008 B1 * 12/2013 Prest .................. G02B 27/0176 345/7
10,133,305 B1 * 11/2018 Sullivan ............. G02B 27/0176

(Continued)

FOREIGN PATENT DOCUMENTS

CN 104808341 A 7/2015
CN 105388614 A 3/2016

(Continued)

OTHER PUBLICATIONS

Invitation to Pay Additional Fees from PCT/US2021/040346, dated Oct. 27, 2021, 14 pages.

(Continued)

*Primary Examiner* — Dorothy Harris
(74) *Attorney, Agent, or Firm* — BAKERHOSTETLER

(57) ABSTRACT

A head-mountable device can include modules that provide fit adjustment capabilities when assembled together. By providing head-mountable devices with modular features, certain modules can provide fit adjustment capabilities without requiring other modules to be custom designed or available in a wide variety of sizes and/or shapes. For example, a light seal module that provides engagement of a user's face and transmits light from a display element can be coupled to an HMD module. The coupling module that couples the light seal to the HMD module can be provided in a wide variety of sizes and/or shapes to allow a user to select an appropriate one for optimal alignment of an HMD module. Additionally or alternatively, a light seal module can be provided with manual and/or automated adjustment capabilities to achieve the desired fit.

19 Claims, 6 Drawing Sheets

Related U.S. Application Data of application No. PCT/US2021/040346, filed on Jul. 2, 2021.

(60) Provisional application No. 63/050,049, filed on Jul. 9, 2020.

(56) References Cited

U.S. PATENT DOCUMENTS

| | | | | |
|---|---|---|---|---|
| 10,545,349 | B1 | 1/2020 | Sullivan et al. | |
| 10,617,025 | B1 | 4/2020 | Chen et al. | |
| 2014/0139407 | A1 | 5/2014 | Abdollahi et al. | |
| 2016/0062454 | A1 * | 3/2016 | Wang | G02B 27/0172<br>345/633 |
| 2017/0082859 | A1 * | 3/2017 | Drinkwater | G02B 27/0176 |
| 2017/0307896 | A1 | 10/2017 | Kovaluk et al. | |
| 2019/0041899 | A1 * | 2/2019 | Ellis | G06F 1/163 |
| 2021/0157154 | A1 * | 5/2021 | Ding | G02B 27/0176 |

FOREIGN PATENT DOCUMENTS

| | | | | |
|---|---|---|---|---|
| CN | 105388615 | A | 3/2016 | |
| CN | 205594231 | U * | 9/2016 | G02B 27/0176 |
| CN | 206863341 | U | 1/2018 | |
| CN | 207440426 | U | 6/2018 | |
| CN | 110799891 | A | 2/2020 | |
| CN | 110824896 | A | 2/2020 | |
| CN | 210166572 | U | 3/2020 | |
| CN | 210465858 | U | 5/2020 | |

OTHER PUBLICATIONS

International Preliminary Report on Patentability from PCT/US2021/040346, dated Jan. 19, 2023, 3 pages.

* cited by examiner

HEAD-MOUNTABLE DEVICES WITH MODULAR ASSEMBLIES FOR FIT ADJUSTMENT

CROSS-REFERENCE TO RELATED APPLICATION

This application is a continuation of U.S. patent application Ser. No. 18/094,896, entitled "HEAD-MOUNTABLE DEVICES WITH MODULAR ASSEMBLIES FOR FIT ADJUSTMENT," filed Jan. 9, 2023, which is a continuation of International Application No. PCT/US2021/040346, entitled "HEAD-MOUNTABLE DEVICES WITH MODULAR ASSEMBLIES FOR FIT ADJUSTMENT," filed Jul. 2, 2021, which claims the benefit of U.S. Provisional Application No. 63/050,049, entitled "HEAD-MOUNTABLE DEVICES WITH MODULAR ASSEMBLIES FOR FIT ADJUSTMENT," filed Jul. 9, 2020, the entirety of each of which is incorporated herein by reference.

TECHNICAL FIELD

The present description relates generally to head-mountable devices, and, more particularly, to head-mountable devices with modular assemblies for fit adjustment.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
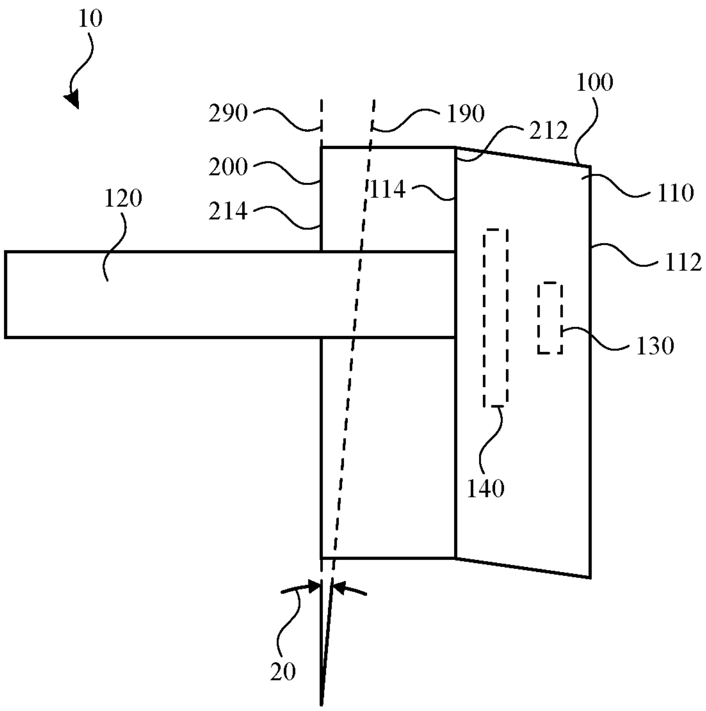
FIG. 1 illustrates a side view of a head-mountable device, according to some embodiments of the present disclosure.
Figure 2:
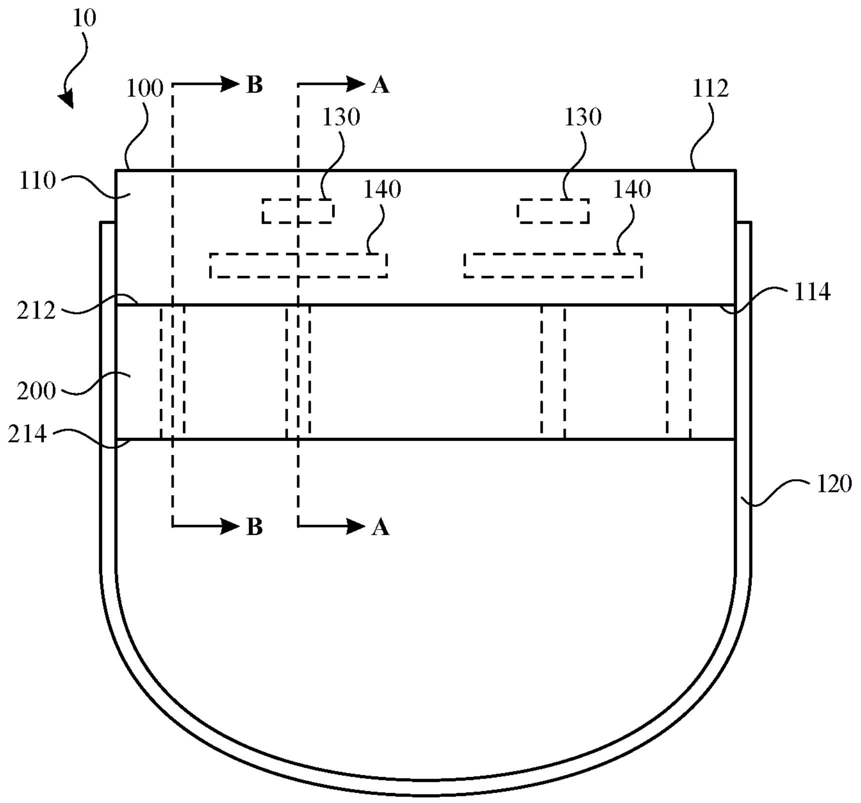
FIG. 2 illustrates a top view of the head-mountable device of FIG. 1, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Many of the functions performed by a head-mountable device are optimally experienced when the components are in their most preferred position and orientation with respect to a user wearing the head-mountable device. For example, the head-mountable device can include a display element that visually outputs display-based information toward the eyes of the user. The position and orientation of the display elements relative to the eyes depends, at least in part, on how the head-mountable device is positioned on the face of the user. Due to variations in facial features across different users, a given head-mountable device may require adjustment to accommodate different users. For example, different users can have different facial features (e.g., face plane slope, forehead size, eye location). Accordingly, different users may perceive the displayed information differently.

It can be costly to require each user to acquire an entire head-mountable device that is specifically tailored to their facial features. In particular, such an approach would require customization of each head-mountable device and/or the ability to choose from a wide variety of head-mountable devices.

Systems of the present disclosure can provide a head-mountable device with modules that provide fit adjustment capabilities when assembled together. By providing head-mountable devices with modular features, certain modules can provide fit adjustment capabilities without requiring other modules to be custom designed or available in a wide variety of sizes and/or shapes. For example, a light seal module that provides engagement of a user's face and transmits light from a display element can be coupled to an HMD module. The coupling module that couples the light seal to the HMD module can be provided in a wide variety of sizes and/or shapes to allow a user to select an appropriate one for optimal alignment of an HMD module. Additionally or alternatively, a light seal module can be provided with manual and/or automated adjustment capabilities to achieve the desired fit.

These and other embodiments are discussed below with reference to FIGS. 1-10. However, those skilled in the art will readily appreciate that the detailed description given herein with respect to these Figures is for explanatory purposes only and should not be construed as limiting.

According to some embodiments, for example as shown in FIG. 1, a head-mountable device 10 includes an HMD module 100 and a light seal module 200. The HMD module 100 includes a frame 110 that is worn on a head of a user. The frame 110 can be positioned in front of the eyes of a user to provide information within a field of view of the user. The HMD module 100 and/or the light seal module 200 can provide nose pads or another feature to rest on a user's nose.

The frame 110 can be supported on a user's head with the securement element 120. The securement element 120 can wrap or extend along opposing sides of a user's head. The securement element 120 can optionally include earpieces for wrapping around or otherwise engaging or resting on a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, the securement element 120 can include multiple components to engage a user's head. The securement element 120 can extend from the HMD module 100 and/or the light seal module 200.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 10, as discussed further herein. While several components are shown within the frame 110, it will be understood that some or all of these components can be located anywhere within or on the head-mountable device 10. For example, one or more of these components can be positioned within the securement element 120 of the head-mountable device 10.

The frame 110 can include and/or support one or more camera modules 130. The camera modules 130 can be positioned on or near an outer side 112 of the frame 110 to capture images of views external to the head-mountable device 10. As used herein, an outer side of a portion of a head-mountable device is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 10 can include display elements 140 that provide visual output for viewing by a user wearing the head-mountable device 10. One or more display elements 140 can be positioned on or near an inner side 114 of the frame 110. As used herein, an inner side 114 of a portion of a head-mountable device is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment. As used herein, a physical environment refers to a physical world that people can interact with without the aid of electronic systems. In contrast, a computer-generated reality (CGR) environment refers to a wholly or partially simulated environment that people interact with via an electronic system. Examples of CGR include virtual reality, mixed reality, and augmented reality. Electronic systems that enable a person to interact with various CGR environments include head-mountable devices, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). Rather than an opaque display, a head-mountable system may have a transparent or translucent display.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance of the user. IPD is defined as the distance between the centers of the pupils of a user's eyes.

The pair of display elements 140 can be mounted to the frame 110 and separated by a distance. The distance between the pair of display elements 140 can be designed to correspond to the IPD of a user. The distance can be adjustable to account for different IPDs of different users that may wear the head-mountable device 10. For example, either or both of the display elements 140 may be movably mounted to the frame 110 to permit the display elements 140 to move or translate laterally to make the distance larger or smaller. Any type of manual or automatic mechanism may be used to permit the distance between the display elements 140 to be an adjustable distance. For example, the display elements 140 can be mounted to the frame 110 via slidable tracks or guides that permit manual or electronically actuated movement of one or more of the display elements 140 to adjust the distance there between.

Additionally or alternatively, the display elements 140 can be moved to a target location based on a desired visual effect that corresponds to user's perception of the display element 140 when it is positioned at the target location. The target location can be determined based on a focal length of the user and/or optical elements of the system. For example, the user's eye and/or optical elements of the system can determine how the visual output of the display element 140 will be perceived by the user. The distance between the display element 140 and the user's eye and/or the distance between the display element 140 and one or more optical elements can be altered to place the display element 140 at, within, or outside of a corresponding focal distance. Such adjustments can be useful to accommodate a particular user's eye, corrective lenses, and/or a desired optical effect.

While the light seal module 200 is shown schematically with a particular size and shape, it will be understood that the size and shape of the light seal module 200, particularly at the inner side 214 of the light seal module 200, can have a size and shape that accommodates the face of a user wearing the head-mountable device 10. For example, the inner side 214 can provide a shape that generally matches the contours of the user's face around the eyes of the user. The inner side 214 can be provided with one or more features that allow the light seal module 200 to conform to the face of the user to enhance comfort and block light from entering the light seal module 200 at the point of contact with the face. For example, the inner side 214 can provide a flexible, soft, elastic, and/or compliant structure.

While the head-mountable device 10 is worn by a user, with the inner side 214 of the light seal module 200 against the face of the user and/or with the securement element 120 against the head of the user, the light seal module can remain in a fixed location and orientation with respect to the face and head of the user. Furthermore, in such a configuration the HMD module 100 can also be maintained in a fixed location and orientation with respect to the face and head of the user. Given the variety of head and face shapes that different users may have, it can be desirable to provide a light seal module 200 with customization and adjustability so that the HMD module 100 is in a desired position and orientation with respect to the face and head of the user during use.

Figure 3:
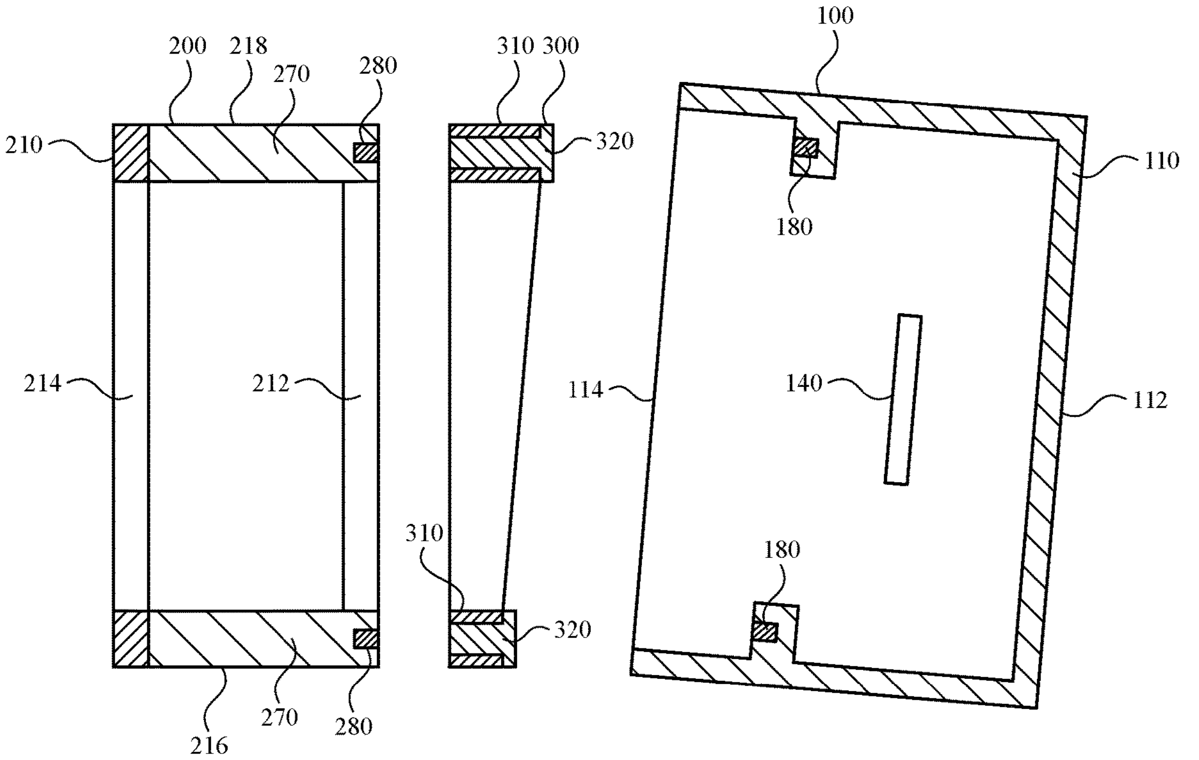
FIG. 3 illustrates an exploded side sectional view of the head-mountable device of FIG. 1 taken along line A-A, according to some embodiments of the present disclosure.
Figure 4:
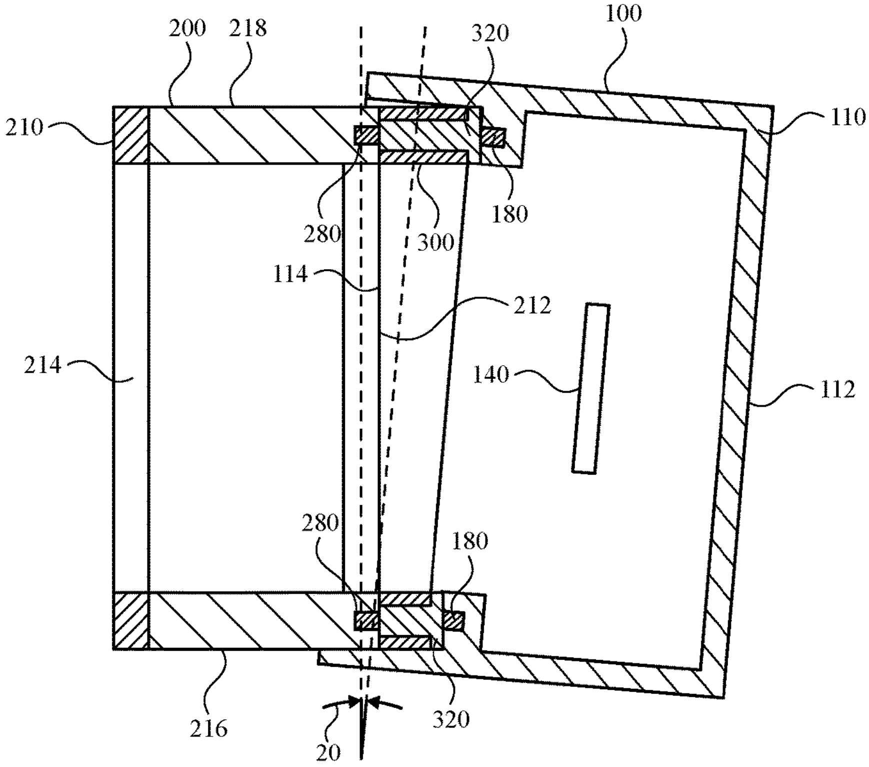
FIG. 4 illustrates an assembled side sectional view of the head-mountable device of FIG. 1 taken along line A-A, according to some embodiments of the present disclosure.
Figure 5:
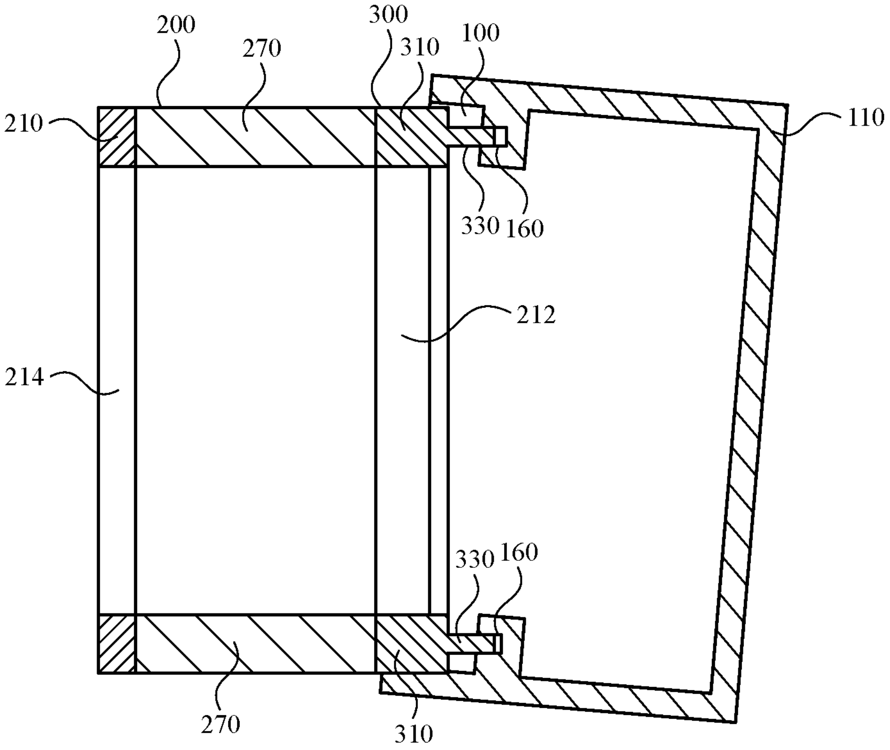
FIG. 5 illustrates an assembled side sectional view of the head-mountable device of FIG. 1 taken along line B-B, according to some embodiments of the present disclosure.

Referring now to FIGS. 3-5, an HMD module and a light seal module can provide an interface that allows adjustment and customization of relative distances and orientations there between.

As shown in FIG. 3, the light seal module 200 can include a chassis 210 that provides structural support to one or more other components of the light seal module 200. The chassis 210, or portions thereof, can extend to, from, and/or between the inner side 214 and the outer side 212, as well as the upper side 218 and the lower side 216. The chassis 210 can support a cover 270 that extends at least partially from the outer side 212 to the inner side 214. The chassis 210 and/or the cover 270 can define an interior space through which light can pass, thereby providing to the user wearing the head-mountable device a view of a display element of the HMD module 100. Such a view can be enhanced by preventing the ingress of light from the external environment and into the light seal module 200.

The head-mountable device can include one or more coupling modules 300 that couple the HMD module 100 to the light seal module 200 with a relative position and orientation that is preferred for a given user. The coupling module 300 can have a side that matches the contours of the inner side 114 of the HMD module 100 and an opposite side of that matches the contours of the outer side 212 of the light seal module 200.

The coupling module 300 can include a body 310 that defines at least a portion of the periphery of the coupling module 300. The body 310 can extend partially or entirely about an interior region defined within the coupling module 300. The coupling module 300 can further include one or more magnets 320 supported by the body 310.

As shown in FIG. 4, the coupling module 300 can facilitate coupling of the HMD module 100 to the light seal module 200 in a relative position and orientation that aligns the display elements 140 of the HMD module 100 in a preferred position and orientation for viewing by the user. The coupling module 300 can sealingly engage against the HMD module 100 and/or the light seal module 200 to prevent ingress of light from an external environment. Additionally or alternatively, the coupling module 300 can extend at least partially within and/or about one or more portions of the HMD module 100 and/or the light seal module 200. The magnets 320 of the coupling module 300 can be magnetically coupled to corresponding magnets 180 of the HMD module 100 and/or magnets 280 of the light seal module 200.

As used herein, "magnet" can include a magnet of a hard magnetic material and/or a magnet of a soft magnetic material. For example, some of the magnets 180, 280, and 320 can form permanent magnets and some of the magnets 180, 280, and 320 can be responsive to magnetic fields. In some embodiments, the magnets 280 are permanent magnets, and the magnets 180 and 320 are responsive to magnetic fields. In some embodiments, the magnets 180 and 320 are permanent magnets, and the magnets 280 are responsive to magnetic fields. Hard magnetic materials include materials that retain their magnetism even after the removal of an applied magnetic field. Magnets that include hard magnetic material can form permanent magnets. Hard magnetic materials include neodymium (NdFeB), ferrite, AlNiCo, iron-neodymium, iron-boron, cobalt-samarium, iron-chromium-cobalt, and combinations or alloys thereof. Soft magnetic materials include materials that are responsive to magnetic fields, but do not retain their magnetism after removal of an applied magnetic field. Magnets that include soft magnetic material can form temporary magnets. Soft magnetic materials include iron, iron-cobalt, iron-silicon (FeSi), steel, stainless steel, iron-aluminum-silicon, nickel-iron, ferrites, and combinations or alloys thereof. It will be recognized that "hard magnetic" and "soft magnetic" does not necessarily relate to the rigidity of the materials.

It will be understood that other attachment mechanisms can be employed in addition to or as an alternative to magnets. For example, rather than or in addition to magnets 180, the HMD module 100 can include other attachment elements referred to herein as "HMD module attachment elements." By further example, rather than or in addition to magnets 280, the light seal module 200 can include other attachment elements referred to herein as "light seal module attachment elements." By further example, rather than or in addition to magnets 320, the coupling module 300 can include other attachment elements referred to herein as "coupling module attachment elements."

Additional or alternative mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the HMD module 100, the light seal module 200, and/or the coupling module 300 together. The modules can remain secured to each other until an optional release mechanism is actuated. The release mechanism can be provided on an outer surface of the head-mountable device 10 for access by a user.

As further shown in FIG. 4, the coupling module 300 can couple the light seal module 200 to the HMD module 100 in a position and orientation that is preferred for alignment, for example of the display element 140, with respect to the user. For example, the coupling module 300 can provide a shape that tilts the light seal module 200 relative to the HMD module 100 at an angle 20. By further example, the coupling module 300 can have variable thicknesses at different portions thereof, such as at upper and lower portions thereof. By providing different thicknesses, the coupling module 300 can cause the upper side 218 of the light seal module 200 and the lower side 216 of the light seal module 200 to be different distances away from the HMD module 100. This can result in the tilt that forms a non-zero angle 20 between the light seal module 200 and the HMD module 100. It will be understood that the angle can be any size, as well as formed on any side of the head-mountable device 10. For example, the tilt can be upward or downward.

Additionally or alternatively, the angle 20 can also be formed on another (e.g., right or left) side of the head-mountable device 10. For example, the tilt can be formed to control the position and/or orientation of the HMD module 100 with respect to each of the right and left eyes of the user. Other directions of tilt can also be achieved.

As further shown in FIG. 4, the coupling module 300 can be selected to control a total distance between the display element 140 and the user's eyes. For example, whether or not an angle 20 is formed by controlling the relative orientations of the light seal module 200 and the HMD module 100, the coupling module 300 can control the relative position of the light seal module 200 and the HMD module 100 by providing a selected spacing there between. Given a known position of the eyes relative to the light seal module 200, the coupling module 300 can thereby be selected for a given user to position the display elements 140 at a preferred position.

The tilt and spacing provided by the coupling module 300 can correspond to a shape of the user's face (e.g., face plane), in which the coupling module 300 is selected to achieve a particular orientation of the HMD module 100 regardless of face shape. Accordingly, the coupling module 300 can be provided to accommodate a wide variety of face shapes without requiring modification or customization of either of the light seal module 200 or the HMD module 100. As such, any given light seal module 200 and HMD module 100 can be used by a variety of different users where each user can be provided with a coupling module 300 that accommodates that user's face.

As shown in FIG. 5, the attachment of the coupling module 300 can be further facilitated by sliding mechanisms that guide the components into preferred relative positions. For example, the coupling module 300 can include one or more posts 330 that are received into corresponding recesses 160 of the HMD module 100. While the posts 330 are shown as being partially received into the recesses 160, it will be understood that the posts 330 can be fully received or inserted to any extent desired. It will be further understood that the positions of the posts and recesses can be swapped, such that the HMD module 100 provides posts that are received by recesses of the coupling module 300. Additionally or alternatively, additional posts and recesses can be provided at the interface of the coupling module 300 and the light seal module 200. The sliding mechanisms provided by such posts and recesses can facilitate alignment of coupled modules without necessarily providing a retaining force. Such a retaining force can be provided, for example, by the magnets or other attachment elements described herein.

Referring now to FIGS. 6-9, a light seal module can be provided with adjustment capabilities integrated therein so that various different facial structures can be accommodated by the light seal module itself. Such a light seal module can be directly coupled to an HMD module, for example without an accompanying coupling module. Corresponding attachment elements, such as those discussed herein, can be provided for direct coupling of the light seal module to the HMD module.

Figure 6:
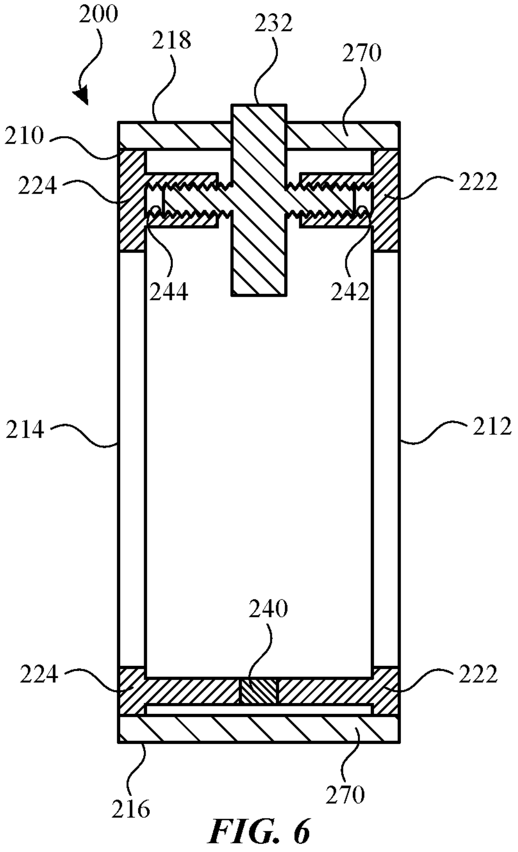
FIG. 6 illustrates a side sectional view of a light seal module, according to some embodiments of the present disclosure.

FIG. 6 illustrates a light seal module 200 with adjustment capabilities to alter a degree of tilt created by the light seal module 200. As shown in FIG. 6, the light seal module 200 can include a chassis 210 formed by an inner chassis portion 224 and an outer chassis portion 222. For example, the inner chassis portion 224 can define the inner side 214 of the light seal module 200, and the outer chassis portion 222 can define the outer side 212 of the light seal module 200. The inner chassis portion 224 can extend to, from, and/or between the upper side 218 and/or the lower side 216 of the light seal module 200. The inner chassis portion 224 and the outer chassis portion 222 can support a cover 270 extending about an interior region of the light seal module 200 and defining at least some of an outer periphery of the light seal module 200.

The relative position and/or orientation of the inner chassis portion 224 and the outer chassis portion 222 can be adjusted by one or more mechanisms. As shown in FIG. 6, an adjustment dial 232 can engage each of the inner chassis portion 224 and the outer chassis portion 222 in an arrangement such as with a turnbuckle screw. For example, the inner chassis portion 224 can provide an inner thread 244, and the outer chassis portion 222 can provide an outer thread 242. Both the inner thread 244 and the outer thread 242 can be simultaneously engaged by the adjustment dial 232. The threaded interfaces can have opposite (e.g., right-hand and left-hand) directions, such that rotation of the adjustment dial 232 in one direction pulls the inner chassis portion 224 and the outer chassis portion 222 toward each other, and rotation of the adjustment dial 232 in an opposite direction pushes the inner chassis portion 224 and the outer chassis portion 222 away from each other.

The adjustment dial 232 can be accessible to a user for operation. For example, as shown in FIG. 6, at least a portion of the adjustment dial 232 can be positioned on an outer periphery of the light seal module 200. In some embodiments, the adjustment dial 232 can protrude beyond the cover 270, which can provide an opening to accommodate a portion of the adjustment dial 232. In other embodiments, the adjustment dial 232 can be covered by the cover 270 or another component that allows a user to transmit torque and/or forces to the adjustment dial 232 without creating gaps for potential intrusion of debris into the interior region of the light seal module 200.

Operation of the adjustment dial 232 can control the relative orientation of the inner chassis portion 224 and the outer chassis portion 222. For example, a pivot element 240 can be provided on a side of the chassis 210 that is opposite the adjustment dial 232. As portions of the inner chassis portion 224 and the outer chassis portion 222 (e.g., at the upper side 218) are moved relative to each other, other portions (e.g., at the lower side 216) can maintain a largely consistent spacing, such that the tilt of the light seal module 200 is controlled by operation of the adjustment dial 232. The pivot element 240 can include a hinge, a ball and joint mechanism, a bendable material, and/or another mechanism that facilitates a pivotable coupling.

While the pivot element 240 can be provided to facilitate tile adjustment and to control an angle formed by the outer side 212 and the inner side 214, such a mechanism can be replaced by sliding mechanism, such that operation of the adjustment dial 232 results in a change of the relative positions of (e.g., distance between) the inner chassis portion 224 and the outer chassis portion 222. Such control can be provided in addition to or as an alternative to the tilt adjustment that controls an angle formed by the light seal module 200. Accordingly, the adjustment dial 232 or similar mechanism can provide control of the distance between a display element and the eye of the user.

While the adjustment dial 232 is shown at the upper side 218 and the pivot element is shown at the lower side 216 in FIG. 6, it will be understood that the positions can be swapped. It will be further understood that such components can be provided at other locations to provide tilt with respect to any other axis.

While only one adjustment dial 232 with corresponding threads is illustrated, it will be understood that multiple adjustment dials 232 with corresponding threads can be provided, such as at opposite (e.g., upper and lower) sides of the light seal module 200.

Figure 7:
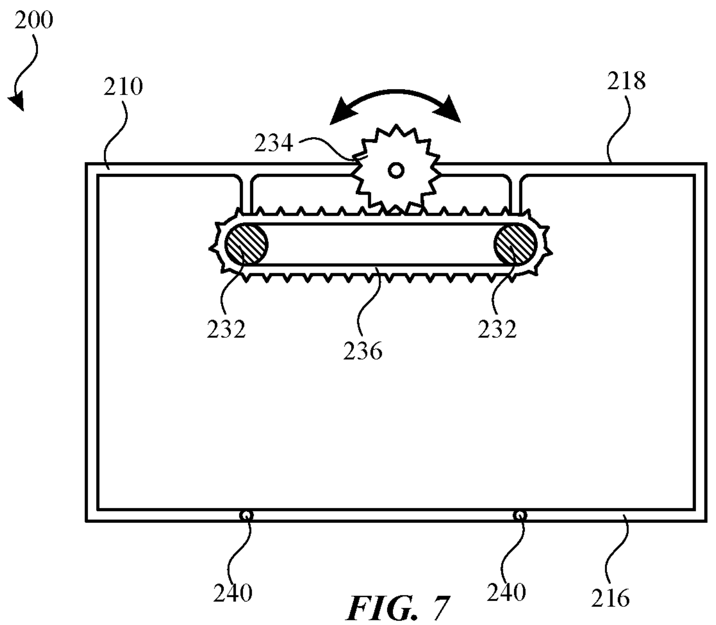
FIG. 7 illustrates a sectional view of a light seal module, according to some embodiments of the present disclosure.

FIG. 7 shows multiple adjustment dials controlled by a single control dial operable by a user. Where multiple adjustment dials 232 are positioned at different locations (e.g., left and right sides), it can be desirable to make simultaneous adjustments to maintain balance between the different locations. As shown in FIG. 7, each of the adjustment dials 232 can be engaged by a belt 236. The belt 236 can be driven by a control dial 234 that is accessible to a user (e.g., protruding to an outer periphery of the light seal module 200). As the control dial 234 is rotated, it engages the belt 236 (e.g., with complementary teeth) which in turn engages each of the adjustment dials 232. As the adjustment dials 232 rotate, each can provide the adjustment capabilities described herein.

Figure 8:
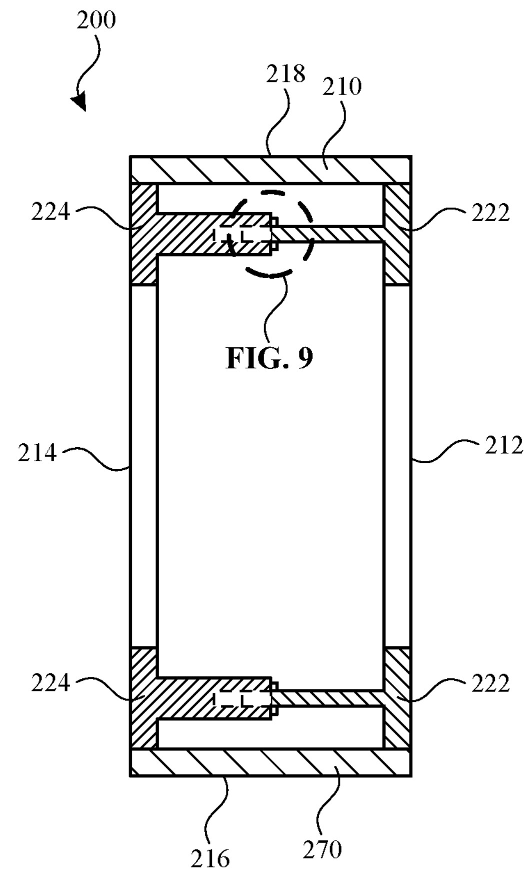
FIG. 8 illustrates a side sectional view of a light seal module, according to some embodiments of the present disclosure.

FIG. 8 illustrates a light seal module 200 with adjustment capabilities to alter a degree of tilt created by the light seal module 200. As shown in FIG. 8, the light seal module 200 can include a chassis 210 formed by an inner chassis portion 224 and an outer chassis portion 222, as described with respect to FIG. 6. The inner chassis portion 224 and the outer chassis portion 222 can support a cover 270 extending about an interior region of the light seal module 200 and defining at least some of an outer periphery of the light seal module 200.

As shown in FIG. 8, the inner chassis portion 224 and the outer chassis portion 222 can controllably slide relative to each other to control a degree of tilt. For example, the inner chassis portion 224 and the outer chassis portion 222 can be allowed to slide to move toward each other at one interface and/or move away from each other at another interface.

Figure 9:
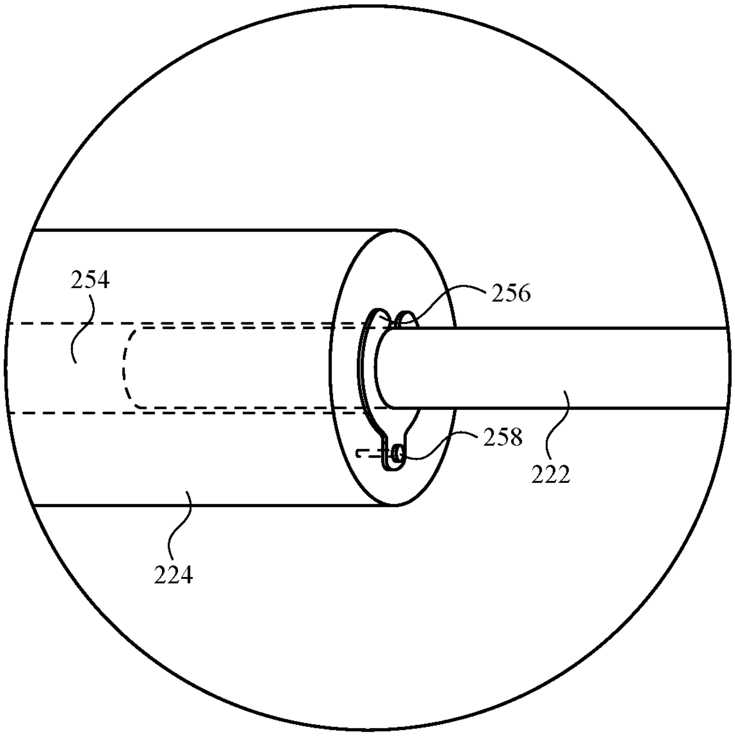
FIG. 9 an enlarged view of a portion of the light seal module of FIG. 8, according to some embodiments of the present disclosure.

As shown in FIG. 9, one of the chassis portions (e.g., the inner chassis portion 224) can provide a chamber 254, and the other chassis portion (e.g., the outer chassis portion 222) can extend at least partially into the chamber 254 and act as a piston therein. The relative movement of the chassis portions can be allowed or prevented by withholding or applying an amount of friction or other force, such as with a clip 256. Generally, the chassis portions can be allowed to move (e.g., slide) relative to each other until a locking mechanism is engaged. For example, as further shown in FIG. 9, a clip 256 can be clasped onto one of the chassis portions (e.g., the outer chassis portion 222) and be secured thereto (e.g., with friction). The clip 256 can be secured to the outer chassis portion, such as with a fastener 258. Thereby, the clip 256 can secure the inner chassis portion 224 and the outer chassis portion 222 in a fixed relative position while engaged. The clip 256 can be disengaged to permit further adjustment. It will be understood that multiple clips 256 can be stacked together to provide the desired amount of friction for locking. In some embodiments, the clip 256 can act to clamp one of the chassis portions onto the other to provide the friction for locking.

While the sliding interfaces are shown at both the upper side 218 and the lower side 216 in FIG. 8, it will be understood that the fewer or more sliding interfaces can be provided. It will be further understood that one or more sliding interfaces can be replaced by a pivot element. It will be further understood that such sliding interfaces can be provided at other locations to provide tilt with respect to any other axis.

It will be understood that other mechanisms can be provided to alter the distance between portions of a light seal module to control the relative positions and/or orientations of components thereof. For example, the adjustment mechanisms can include one or more sliding members, pistons, rack and pinion systems, and the like.

It will be further understood that mechanisms for altering the distance between portions of a light seal module can include multiple components acting with different effect. For example, one or more adjustment mechanisms can facilitate movement in one direction, and one or more adjustment mechanisms (e.g., springs, elastics, and the like) can bias components toward movement in another direction. Additionally or alternatively, adjustment mechanisms can include one or more stoppers and/or dampeners that limit movement in a particular direction.

Additionally or alternatively, adjustments described herein can be actively controlled by the head-mountable device 10 itself. For example, adjustments can be made by one or more motors, actuators, and the like. Such mechanisms can be controlled by a process or other control circuitry of the head-mountable device 10, for example a component of the HMD module 100. Operable connections can be provided as needed. Control of such components can be guided by sensors that detect conditions, such as the user's facial features.

Figure 10:
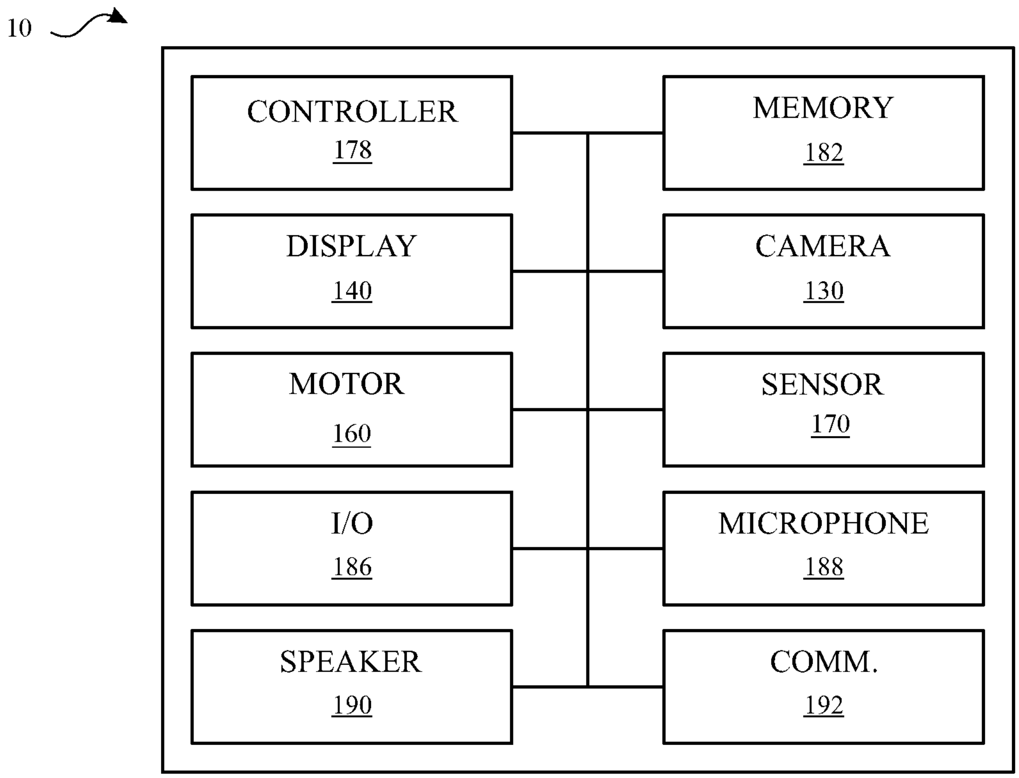
FIG. 10 illustrates a block diagram of a head-mountable device, in accordance with some embodiments of the present disclosure.

Referring now to FIG. 10, components of the head-mountable device can be operably connected to provide the performance described herein. FIG. 10 shows a simplified block diagram of an illustrative head-mountable device 10 in accordance with one embodiment of the invention. It will be appreciated that components described herein can be provided on one, some, or all of an HMD module, a light seal module, a coupling module, and/or a securement element. It will be understood that additional components, different components, or fewer components than those illustrated may be utilized within the scope of the subject disclosure.

As shown in FIG. 10, the head-mountable device 10 can include a controller 178 (e.g., control circuitry) with one or more processing units that include or are configured to access a memory 182 having instructions stored thereon. The instructions or computer programs may be configured to perform one or more of the operations or functions described with respect to the head-mountable device 10. The controller 178 can be implemented as any electronic device capable of processing, receiving, or transmitting data or instructions. For example, the controller 178 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 10. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 10 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display element 140 for close up viewing. The optical subassembly can include one or more lenses, mirrors, or other optical devices.

The head-mountable device 10 can include adjustment control components described herein, such as a motor, an actuator, and the like for moving components to a desired relative position and/or orientation.

The head-mountable device 10 can include one or more sensors 170, such as the sensors of a sensor assembly, as described herein. The head-mountable device 10 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 10 can include an input/output component 186, which can include any suitable component for connecting head-mountable device 10 to other devices. Suitable components can include, for example, audio/video jacks, data connectors, or any additional or alternative input/output components. The input/output component 186 can include buttons, keys, or another feature that can act as a keyboard for operation by the user.

The head-mountable device 10 can include the microphone 188 as described herein. The microphone 188 can be operably connected to the controller 178 for detection of sound levels and communication of detections for further processing, as described further herein.

The head-mountable device 10 can include the speakers 190 as described herein. The speakers 190 can be operably connected to the controller 178 for control of speaker output, including sound levels, as described further herein.

The head-mountable device 10 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 10 can include a battery, which can charge and/or power components of the head-mountable device 10. The battery can also charge and/or power components connected to the head-mountable device 10.

Accordingly, embodiments of the present disclosure provide a head-mountable device with modules that provide fit adjustment capabilities when assembled together. By providing head-mountable devices with modular features, certain modules can provide fit adjustment capabilities without requiring other modules to be custom designed or available in a wide variety of sizes and/or shapes. This allows different users to use any given HMD module in a proper alignment with respect to the corresponding user, without requiring different HMD modules for each user or extensive adjustment capabilities within the HMD module itself.

Various examples of aspects of the disclosure are described below as clauses for convenience. These are provided as examples, and do not limit the subject technology.

Clause A: a head-mountable device comprising: an HMD module comprising: a frame having an outer side and an inner side; a display element supported by the frame; and an HMD module attachment element; a light seal module comprising: a chassis having an outer side and an inner side; a cover extending about the chassis; and a light seal module attachment element; and a coupling module between the HMD module and the light seal module, the coupling module comprising a coupling module attachment element configured to releasably engage the HMD module attachment element and the light seal module attachment element and secure the HMD module to the light seal module in a fixed relative position and orientation.

Clause B: a system comprising: an HMD module comprising a display element; a light seal module configured to rest on a face of a user; a first coupling module; and a second coupling module; wherein the system is configured to be transitioned between: a first configuration in which the HMD module is coupled to the light seal module by the first coupling module, forming a first angle between the HMD module and the light seal module; and a second configuration in which the HMD module is coupled to the light seal module by the second coupling module, forming a second angle between the HMD module and the light seal module, the second angle being different than the first angle.

Clause C: a head-mountable device comprising: an HMD module having an outer side and an inner side, the HMD module comprising: a frame; a display element supported by the frame; and an HMD module attachment element; and a light seal module having an inner side and an outer side, the light seal module comprising: a chassis having an inner chassis portion and an outer chassis portion, wherein the inner chassis portion and the outer chassis portion are adjustable to control an orientation of the inner side of the light seal module with respect to the display element of the HMD module; a cover extending about the chassis; and a light seal module attachment element configured to be releasably coupled to the HMD module attachment element.

One or more of the above clauses can include one or more of the features described below. It is noted that any of the following clauses may be combined in any combination with each other, and placed into a respective independent clause, e.g., clause A, B, or C.

Clause 1: the HMD module attachment element, the light seal module attachment element, and the coupling module attachment element each comprise a magnet.

Clause 2: the coupling module further comprises a body that extends around an interior region bounded by the coupling module, the interior region providing a light pathway for light from the display element to travel to eyes of a user.

Clause 3: the HMD module further comprises recesses on the inner side; the coupling module further comprises pins on the outer side, wherein the pins are slideably received into the recesses.

Clause 4: the coupling module abuts an outer side of the light seal module and an inner side of the HMD module.

Clause 5: a securement element extending from the HMD module and configured to secure the head-mountable device to a head of a user with the inner side of the light seal module against a face of the user.

Clause 6: the coupling module and the outer side of the chassis are positioned within the frame of the HMD module.

Clause 7: in the first configuration, the first coupling module separates the HMD module and the light seal module by a first distance; and in the second configuration, the second coupling module separates the HMD module and the light seal module by a second distance, different than the first distance.

Clause 8: the HMD module comprises an HMD module attachment element; the light seal module comprises a light seal module attachment element; the first coupling module comprises a first coupling module attachment element configured to releasably engage the HMD module attachment element and the light seal module attachment element in the first configuration; and the second coupling module comprises a second coupling module attachment element configured to releasably engage the HMD module attachment element and the light seal module attachment element in the second configuration.

Clause 9: the HMD module attachment element, the light seal module attachment element, the first coupling module attachment element, and the second coupling module attachment element each comprise a magnet.

Clause 10: the first coupling module comprises a first body having a first thickness; and the second coupling module comprises a second body having a second thickness, different than the first thickness.

Clause 11: the inner chassis portion and the outer chassis portion are lockably movable with respect to each other on a first side of the light seal module.

Clause 12: the light seal module further comprises a pivot element on a second side of the light seal module, opposite the first side.

Clause 13: the light seal module further comprises an adjustment dial that threadably engages the inner chassis portion and the outer chassis portion.

Clause 14: a portion of the adjustment dial extends outside of the cover.

Clause 15: the light seal module further comprises: a first adjustment dial that threadably engages the inner chassis portion and the outer chassis portion; a second adjustment dial that threadably engages the inner chassis portion and the outer chassis portion; a belt engaging the first adjustment dial and the second adjustment dial; and a control dial configured to drive the belt when rotated.

Clause 16: the inner chassis portion is slidably engaged to the outer chassis portion.

Clause 17: the light seal module further comprises a clip that locks the inner chassis portion and the outer chassis portion together.

In the present technology, the use of personal information data, can be used to the benefit of users. For instance, health and fitness data may be used to provide insights into a user's general wellness, or may be used as positive feedback to individuals using technology to pursue wellness goals. The present disclosure contemplates that the entities responsible for the collection, analysis, disclosure, transfer, storage, or other use of such personal information data will comply with well-established privacy policies and/or privacy practices. Moreover, it is the intent of the present disclosure that personal information data should be managed and handled in a way to minimize risks of unintentional or unauthorized access or use.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
an HMD module comprising:
a frame having an outer side and an inner side;
a display element supported by the frame; and
an HMD module attachment element;
a light seal module comprising:
a chassis having an outer side and an inner side, the chassis extending entirely about a first interior region;
a cover extending about the chassis; and
a light seal module attachment element; and
a coupling module between the HMD module and the light seal module, the coupling module comprising:
a body having an outer side and an inner side, the body extending entirely about a second interior region between the display element and the first interior region; and
a coupling module attachment element extending from the inner side of the body to the outer side of the body, the coupling module attachment element configured to releasably engage the HMD module attachment element and the light seal module attachment element and secure the HMD module to the light seal module in a fixed relative position and orientation.

2. The head-mountable device of claim 1, wherein the HMD module attachment element, the light seal module attachment element, and the coupling module attachment element each comprise a magnet.

3. The head-mountable device of claim 1, wherein the first interior region and the second interior region provide a light pathway for light from the display element to travel to eyes of a user.

4. The head-mountable device of claim 1, wherein:
the HMD module further comprises recesses on the inner side of the frame; and
the coupling module further comprises pins on the outer side of the body, wherein the pins are slideably received into the recesses.

5. The head-mountable device of claim 1, wherein the coupling module abuts the outer side of the chassis and the inner side of the frame.

6. The head-mountable device of claim 1, further comprising a securement element extending from the HMD module and configured to secure the head-mountable device to a head of a user with the inner side of the chassis against a face of the user.

7. The head-mountable device of claim 1, wherein the coupling module and the outer side of the chassis are positioned within the frame of the HMD module.

8. A head-mountable device comprising:
an HMD module comprising:
a frame having an outer side and an inner side;
a display element supported by the frame; and
one or more HMD module magnets;
a light seal module comprising:
a chassis having an outer side and an inner side, the chassis defining a light seal opening; and
one or more light seal module magnets; and
a coupling module between the HMD module and the light seal module, the coupling module comprising:

a body having an outer side and an inner side, the body extending entirely about a coupling opening, wherein the light seal opening and the coupling opening provide a view to the display element; and one or more coupling module magnets extending from the inner side of the body to the outer side of the body and being configured to releasably engage the one or more HMD module magnets and the one or more light seal module magnets.

9. The head-mountable device of claim 8, wherein, when the one or more coupling module magnets is engaged to the one or more HMD module magnets and the one or more light seal module magnets, the HMD module is secured to the light seal module in a fixed relative position and orientation.

10. The head-mountable device of claim 8, wherein:

the HMD module further comprises recesses on the inner side of the frame; and the coupling module further comprises pins on the outer side of the body, wherein the pins are slideably received into the recesses.

11. The head-mountable device of claim 8, wherein the coupling module abuts the outer side of the chassis and the inner side of the frame.

12. The head-mountable device of claim 8, further comprising a securement element extending from the HMD module and configured to secure the head-mountable device to a head of a user with the inner side of the chassis against a face of the user.

13. The head-mountable device of claim 8, wherein the coupling module and the outer side of the chassis are positioned within the frame of the HMD module.

14. A head-mountable device comprising:

an HMD module comprising:

a frame;

a display element supported by the frame;

one or more HMD module attachment elements; and one or more HMD module sliding mechanisms;

a light seal module comprising:

a chassis defining a light seal opening; and one or more light seal module attachment elements; and a coupling module between the HMD module and the light seal module, the coupling module comprising:

a body extending entirely about a coupling opening, wherein the light seal opening and the coupling opening provide a view to the display element;

one or more coupling module attachment elements configured to apply a retaining force to the one or more HMD module attachment elements and the one or more light seal module attachment elements; and one or more coupling module sliding mechanisms configured to interact with the one or more HMD module sliding mechanisms to facilitate alignment of the coupling module with respect to the HMD module while the one or more coupling module attachment elements apply the retaining force to the one or more HMD module attachment elements.

15. The head-mountable device of claim 14, wherein the one or more HMD module attachment elements, the one or more light seal module attachment elements, and the one or more coupling module attachment elements each comprise a magnet.

16. The head-mountable device of claim 14, wherein:

the one or more HMD module sliding mechanisms includes one or more recesses; and the one or more coupling module sliding mechanisms includes one or more posts.

17. The head-mountable device of claim 14, wherein:

the frame has an outer side and an inner side;

the chassis has an outer side and an inner side; and the body has an outer side and an inner side.

18. The head-mountable device of claim 17, wherein:

the HMD module further comprises recesses on the inner side of the frame; and the coupling module further comprises posts on the outer side of the body, wherein the posts are slideably received into the recesses.

19. The head-mountable device of claim 17, wherein the coupling module and the outer side of the chassis are positioned within the frame of the HMD module.

* * * * *